United States Patent [19]

Money et al.

[11] Patent Number: 5,452,151
[45] Date of Patent: Sep. 19, 1995

[54] DATA ACCESS MODULE

[75] Inventors: James B. Money, Los Gatos; Ryan J. Money, Morgan Hill; Dennis J. McCormally, Newark, all of Calif.

[73] Assignee: J. Money & Associates, Inc., Los Gatos, Calif.

[21] Appl. No.: 272,883

[22] Filed: Jul. 7, 1994

Related U.S. Application Data

[63] Continuation of Ser. No. 890,969, May 29, 1992, abandoned.

[51] Int. Cl.⁶ .............................................. G11B 21/16
[52] U.S. Cl. .................................... 360/75; 360/103; 360/106; 360/104
[58] Field of Search ...................... 360/98.01, 104, 106, 360/103, 107, 75

[56] References Cited

U.S. PATENT DOCUMENTS

| | | | |
|---|---|---|---|
| 3,823,416 | 7/1974 | Warner | 360/122 |
| 4,100,583 | 7/1978 | Koel et al. | 360/113 |
| 4,218,715 | 8/1980 | Garnier | 360/103 |
| 4,359,762 | 11/1982 | Stollorz | 360/98 |
| 4,566,050 | 1/1986 | Beam et al. | 360/113 |
| 4,673,996 | 6/1987 | White | 360/103 |
| 4,802,042 | 1/1989 | Strom | 360/103 |
| 4,870,519 | 9/1989 | White | 360/103 |
| 4,894,740 | 1/1990 | Chaabra et al. | 360/103 |
| 4,949,194 | 8/1990 | MacPherson et al. | 360/106 X |
| 4,965,691 | 10/1990 | Iftikar et al. | 360/133 |
| 5,055,969 | 10/1991 | Putman | 360/104 X |
| 5,086,360 | 2/1992 | Smith et al. | 360/103 |
| 5,140,482 | 8/1992 | Kimura et al. | 360/104 |
| 5,200,868 | 4/1993 | Chapin et al. | 360/103 |
| 5,337,202 | 8/1994 | Jabbarai et al. | 360/97.01 |
| 5,379,171 | 1/1995 | Morehouse et al. | 360/105 |

*Primary Examiner*—Aristotelis Psitos
*Assistant Examiner*—James T. Wilson
*Attorney, Agent, or Firm*—Claude A. S. Hamrick

[57] ABSTRACT

A data access module adapted for use in hard disc drives for accessing information from rotational disc storage media which includes an arm assembly rotatably mounted on a support means adjacent a disc stack within the drive or cartridge for positioning a plurality of magnetic slider head assemblies over a desired data track location on the individual discs of the disc stack, a voice coil actuator means provided to the arm assembly and adapted to cooperate with magnetic actuator means in the drive for moving the arm assembly in response to electrical current flow in the voice coil actuator, electronic control means disposed mounted on the arm assembly, and a magnetoresistive position reticle indicating means for counting data tracks during track access operation. A portion of the arm assembly is fabricated as a ceramic wafer having appropriately prepared surfaces on which the voice coil actuator means and position reticle indicating means are inlaid as plated metal elements and on which the electronic control means are mounted as integrated circuits.

5 Claims, 10 Drawing Sheets

DATA ACCESS MODULE

This is a continuation of application Ser. No. 07/890,969 filed on May 29, 1992, now abandoned.

BACKGROUND OF THE INVENTION

1. Field of the Invention

The present invention relates generally to an improved data access module for use in 3.5", 2.5" and smaller rigid or hard disc drives. More particularly, the invention relates to a combination stand alone data access module having magnetoresistive rotary position indicating means and an improved magnetic head and slider assembly which exhibits improved air bearing characteristics.

2. Brief Description of the Prior Art

Computer hard disc drives having high data storage capability in excess of five megabytes and which exhibit rapid and accurate data access times are well known in the art. The known disc drive mechanisms typically comprise a data access module having multiple read/write heads, which are positionable relative to the discs via an arm assembly, and a voice coil actuator which is part of the arm stack assembly or disc drive. Current state of the art disc drive and data access modules having high memory storage capability and performance are limited principally to high end machines such as large IBM mainframes and the like.

In the area of personal computers, especially portable computers such as laptops, notebooks and the like, a major objective is the realization of a small disc drive which offers maximum memory storage capability, fast and reliable data access, and which is capable of running for extended time periods on battery power alone. In typical hard disc drives, a transducer is mounted on a ceramic slider assembly and is commonly referred to as a magnetic head. The magnetic head is positioned over the recording media (typically a rotatable magnetic disc) such that it floats on a cushion of air or "flies" over the magnetic storage media and transmits signal responses back and forth between the computer and the disc. The magnetic head is mounted on a flexure or suspension assembly which, in turn, is mounted to an arm assembly. The arm assembly includes an actuator, typically a voice coil, by which the trajectory of the arm, and hence the positioning of the magnetic head with respect to a desired data track on the disc, is controlled.

The early arm assemblies positioned the magnetic head in a linear fashion and are commonly known in the art as linear positioning devices or linear actuators. An example linear actuator is disclosed in U.S. Pat. No. 4,359,762 issued to Stollorz. A major disadvantage with linear actuators is that they are expensive to manufacture and they do not lend themselves to miniaturization and high capacity drives since their stepper motors are not capable of incremented movement of about 700–800 tracks per inch (TPI). Other disadvantages associated with linear positioning devices include the related problems of excess signal noise and large power usage. These problems are due primarily to the fact that the signal path between the transducer head and the signal processing circuitry in the disc drive is unduly long. Thus, additional filter and amplification electronics are necessary to overcome these problems.

An alternative approach to positioning the transducer head on the disc is by use of a rotary actuator. This was an early attempt to achieve a miniaturized actuator assembly. Rotary actuators typically have significantly shorter length arm assemblies than a linear actuator since the pivot of the rotary actuator can be mounted immediately adjacent the outer radial edge of the rotatable disc. In this manner, the transducer head sweeps through an arcuate angle, typically 15 to 30 degrees, while accessing different data tracks on the disc. An example of a rotary actuator implemented a removable cartridge for use in high density disc drives is shown in U.S. Pat. No. 4,965,691 issued to Iftikar et al. In this device, and as is typical with current commercial rotary actuator disc drives, the read/write circuitry for the magnetic head is separate from the positioning arm and is disposed in the removable cartridge.

Even though the signal path distance between the transducer head and the data processing electronics in this device is reduced, there still remain problems of excess signal noise and high power usage since in view of directing the signals off the rotary arm assembly for processing by the appropriate circuitry in the cartridge and/or computer. Further, rotary access introduces new problems associated with maintaining a constant flying height and stability for the slider assembly since it now moves at a changing angle with respect to the spinning disc as it accesses different data tracks. This angular relationship between the longitudinal axis of the slider assembly and the direction of spinning movement of the magnetic disc is known in the art as "skew angle".

When the slider assembly is positioned over a moving disc, air is introduced at the forward or leading slider edge, pressurized, thus forming an air bearing under the slider. As the rotary access slider changes position across the moving disc from one data track to another, changes in the tangential disc velocity and skew angle of the slider affect the air bearing pressure under the slider assembly. These variables cause the slider to roll in one direction or another or fly at different heights. It is desirable to control the flying height since this affects the reliable data transfer between the transducer and the recording medium. These problems are exasperated when a miniaturized data access module is contemplated since design tolerances associated with the positioning arm, flexure and their physical connections are greatly magnified and detract from the efficiency and accuracy of the transducer.

U.S. Pat. No. 4,673,996 issued to Dr. James W. White teaches to provide transverse pressurization contours (TPCs) along the outer and inner longitudinal side edges of the slider rails of a slider suspension assembly in an effort to overcome the problems of roll and to help the slider in maintaining an even flying height as it moves across a spinning disc with a changing skew angle. The transverse pressurization contours provide a pressurization region along a leading side edge of each slider rail and a depressurization region across the opposite trailing side edge of each slider rail so that a substantially symmetrical pressure profile across the air bearing is achieved.

In U.S. Pat. No. 4,870,519 also issued to Dr. White, an improvement to the transverse pressurization contour concept is disclosed. In this patent it is recognized that the damping ability of a two rail slider assembly is enhanced by selectively tailoring the configuration of each transverse pressurization contour along the side edges of the slider rails for a particular disc drive application since the effectiveness of the transverse pressurization contours depend upon the specific disc radius, disc rpm, and range of skew angle magnitudes that are present in the data access module system.

In U.S. Pat. No. 4,218,715 issued to M. F. Garnier, a two rail slider assembly is disclosed wherein each slider rail is provided with a shallow recess or relief portion such that an ambient or slightly subambient pressure is produced in these regions during flying operation of the slider head assembly. These relief portions are alleged to provide the slider with mechanical stability with little or reduced sensitivity to skew and discurvature or ripple of the disc while preserving high air bearing stiffness.

Although the prior art has proposed slider rail configurations which address the problems of roll and uneven flying heights, the prior art does not adequately address the problem of generating a sufficient air bearing stiffness at the trailing edge of the slider assembly such that the transducer head is maintained at a low flying height with sufficient air bearing stiffness. Air bearing stiffness and dampening are of particular importance when the data access module is to be used in a disc drive of a portable computer such as a laptop, notebook or the like, wherein the likelihood of shock and other damaging vibrational movements during use are common. Inadequate air bearing stiffness in these drives will permit the transducer head to "crash" or contact the recording media, thus resulting in premature wear and unreliability of the magnetic head assembly.

Accordingly there is a definite need in the art for an improved data access module wherein the head assembly exhibits improved air bearing stiffness and dampening qualities. There is also a need for improved data access module which may be assembled in miniaturized form for use in 3.5", 2.5" and smaller disc drives and wherein the signal path distance between the transducer head and the data processing electronics is greatly reduced so that the problems of capacitance loading and excess power usage are overcome.

SUMMARY OF THE INVENTION

List of Objectives

It is therefore a principal objective of the present invention to provide a novel stand alone data access module wherein the data processing electronics for controlling arm positioning, data tracking, address correction and the read/write functions of the magnetic head are provided directly on an arm assembly of the data access module.

It is another object of the invention to provide a stand alone data access module having a planar voice coil actuator means which exhibits improved fast track to track seeking capabilities and stiffness characteristics in following a selected data track on a disc.

It is another object of the present invention to provide a data access module which includes a plurality of vertically stacked arm assemblies interconnected by a rotary pivot means wherein each arm assembly includes a magnetic transducer head assembly for accessing a plurality of vertically stacked discs.

It is another object of the present invention to provide an improved data access module having a magnetoresistive position indicating means to the arm assembly which achieve faster data track access times than previously achieved by the prior art and with improved accuracy.

It is yet another object of the present invention to provide an improved data access module wherein the magnetoresistive position indicating means aids the voice coil actuator means in correcting positioning errors of the magnetic head with respect to a desired track location on the disc.

It is another object of the present invention to provide a slider assembly whose flying height and roll angle are highly insensitive to slider access velocity.

It is another object of the present invention to provide a slider assembly which exhibits improved air bearing stiffness and damping qualities than previously achieved by the prior art.

Briefly, a preferred embodiment of the present invention comprises a data access module adapted for use in hard disc drives for accessing information from rotational disc storage media including an arm assembly rotatably mounted on a support means adjacent a disc stack within the drive or cartridge for positioning a plurality of magnetic head assemblies over a desired data track location on the individual discs of the disc stack, a voice coil actuator means provided to the arm assembly and adapted to cooperate with magnetic actuator means in the drive for moving the arm assembly in response to electrical current flow in the voice coil actuator, electronic control means disposed mounted on the arm assembly, and a magnetoresistive position reticle indicating means for counting data tracks during track access operation.

A portion of the arm assembly is fabricated as a ceramic wafer having appropriately prepared surfaces on which the voice coil actuator means and position reticle indicating means are inlaid as plated or sputtered metal elements and on which the electronic control means are mounted as integrated circuits.

List of advantages

An important advantage of the present invention is a reduction of capacitance loading and power usage associated with head access achieved by bringing data processing means directly on board the arm assembly.

Another advantage of the present invention is that the novel slider head configuration achieves lower flying heights with greater air bearing stiffness than previously achieved by the prior art thereby improving signal strength and head efficiency.

These and other objects and advantages of the present invention will no doubt become apparent to those skilled in the art from the following drawings, detailed description of the preferred embodiment and the appended claims.

IN THE DRAWING

FIG. 1 shows the data access module as a self contained rotary actuator for implementation in a disc drive shown here positioned adjacent a magnetic storage disc.

DESCRIPTION OF THE PREFERRED EMBODIMENT

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
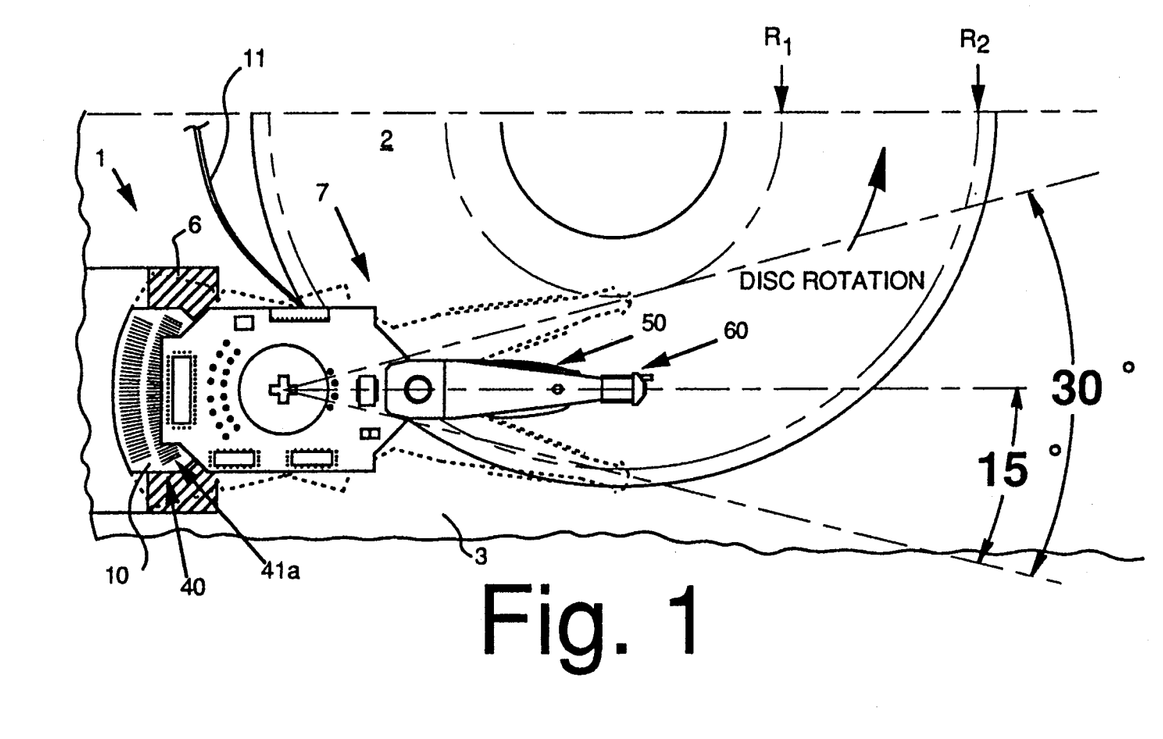
FIG. 1 is a top plan view of a data access module constructed in accordance with one embodiment of the present invention.

A data access module constructed in accordance with one embodiment of the present invention is indicated generally by the reference numeral 1 in FIG. 1. In essence, the data access module 1 is a stand alone rotary actuator positioning device which may be contained within a fixed disc drive (or within a sealed removable disc cartridge for insertion within in a disc drive) and is shown positioned adjacent a disc 2 and mounted in rotary fashion to a housing or support member 3 in the disc drive (or cartridge) via a rotary actuator support and mounting structure (not shown).

The data access module 1 broadly comprises an arm assembly 7, which includes a plurality of vertically stacked arm members; a plurality of suspension assemblies 50, wherein each suspension assembly is associated with a particular arm member of the arm assembly 7; and a plurality of magnetic head slider assemblies 60, each of which are disposed connected to a distal end of each suspension assembly 50. The data access module 1 is preferably connected to the disc drive (not shown) by a flex cable 11.

Figure 2:
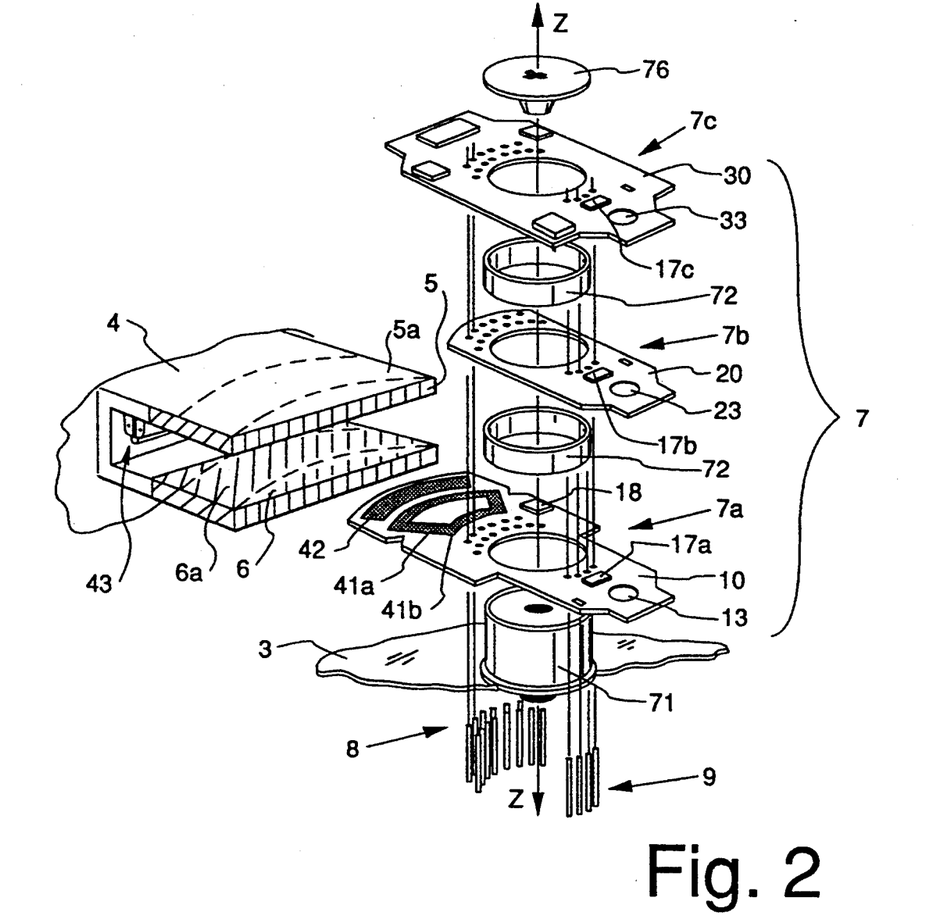
FIG. 2 is an exploded isometric view of a data access module having a bottom, middle and top arm member (the suspension assemblies and gimbal mounted magnetic head assemblies for each arm member are omitted for clarity).

Referring to FIGS. 1-2, the data access module 1 further includes an actuator assembly 40 which, in a preferred embodiment, comprises a coil 41, such as used in voice coil motor actuators for disc drives in general. However, unlike the typical voice coil motor actuators of the prior art, coil assembly 41 of the present invention is planar and is prepared as a flat wire which is spirally wound in a generally arcuate pattern and inlaid on the top (coil 41a) and bottom (coil 41b) wafer-like surfaces of a bottom arm member 10 of the arm assembly 7. This is best seen with reference to FIGS. 2 and 7. Note, while only the top coil 41a is visible in the embodiments of FIGS. 1-6, it is understood that a bottom coil 41b (see FIG. 2) is prepared as a mirror image of the top coil 41a.

The voice coil assembly 41 is positioned on the data access module 1 in a way such that the voice coil assembly 41 (i.e. top coil 41a and bottom coil 41b) is aligned between two stationary magnets 5 and 6. In the preferred embodiment, magnets 5 and 6 are permanent flat bar magnets associated with the drive housing. The magnets 5 and 6 are selectively polarized such that when disposed in alignment with the voice coil assembly 41, a magneto or a rotating coil generator is formed. Thus, the data access module rotates back and forth about the vertical axis Z—Z upon selective energization of the top and bottom coils 41a, 41b. Magnets 5 and 6 are contained within a housing 4 and each have a width dimension sufficient to ensure adequate electromagnetic engagement with the energized voice coil assembly 41 over the entire range of angular (rotational) movement of the data access module 1.

In an alternate embodiment, the permanent magnets may be formed as arcuate flat bar magnets which conform to the arcuate pattern configuration of the voice coil assembly 41. This is shown in phantom as arcuate magnets 5a and 6a. While the voice coil assembly 41 is disclosed as two coils 41a, 41b disposed on top and bottom surfaces of the arm member 10, it is understood that the entire voice coil assembly 41 may be formed solely on either top or bottom surface of the arm member 10.

Referring to FIGS. 2-5, the detail of the arm assemblies 7 will now be described. In the preferred embodiment, the data access module 1 comprises three separate arm assemblies including a bottom arm assembly 7a, a middle arm assembly 7b, and a top arm assembly 7c. Each arm assembly 7a, 7b, and 7c includes an arm member 10, 20, and 30, respectively. Each arm member 10, 20 and 30 is essentially a printed circuit board each of which contain a selected group of integrated circuits (ICs) for controlling the logic functions associated with operation of the magnetic recording heads and the rotary movement and positioning functions of the data access module 1 with respect to the selected data tracks on the spinning disc or discs 2. The ICs on each ceramic platform board member are interconnected to one another and the plated through holes by traces prepared in the ceramic substrate in the conventional manner. Representative traces are indicated generally by numeral 31 in FIG. 5A.

The arm members 10, 20, and 30 are preferably fabricated from a non-conductive ceramic material which is inert to outside ambient environmental conditions. The preferred ceramic should also be easily formable into rigid wafer thin structures having a thickness dimension on the order of 0.025". Further, the formed arm members should exhibit smooth polishing and excellent photolithographic characteristics. An example material is a ceramic mixture known as Zirconia available through 3M Corporation of St. Paul, Minn.

As discussed above, the bottom arm 10 is provided with an actuator in the form of a voice coil assembly 41. The voice coil assembly 41 is metal plated into the top and bottom surfaces of the bottom arm 10. The preferred metal plate material for the voice coil 41 is either gold or copper. Also disposed along the top surface of the bottom arm 10 and adjacent the outer arcuate periphery of the voice coil 41 is a plurality of radially extending lines referred to as the position reticle and indicated generally by the numeral 42. The position reticle comprises a plurality of uniformly polarized magnetic stripes which are scanned by a magnetoresistive head provided to housing 4. The position reticle 42 performs all the positioning algorithms of the data access module 1. This is discussed in more detail below with reference to FIG. 7.

Figure 3A:
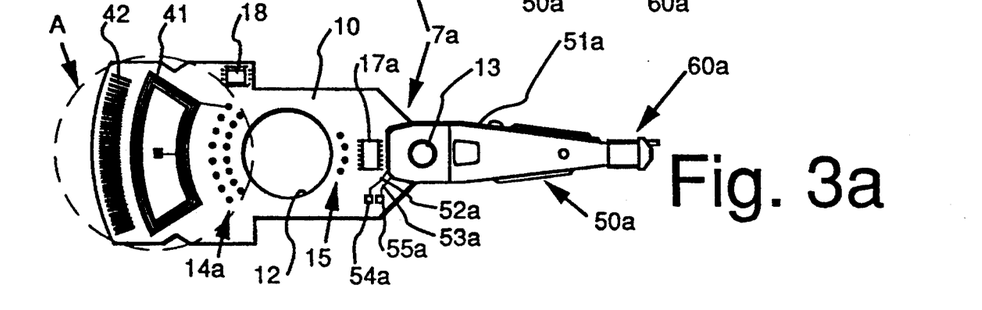
FIG. 3A is a top plan view of the bottom arm assembly member of FIG. 2 shown with a suspension assembly and magnetic head assembly.
Figures 3B, 4A:
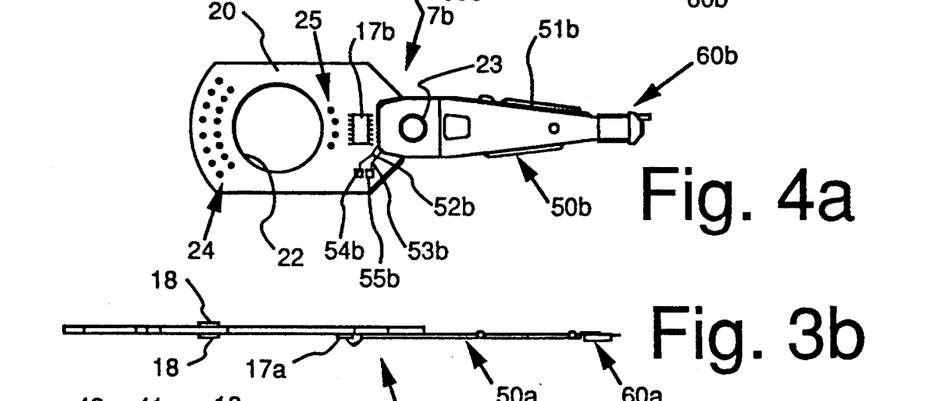
FIG. 3B is a side elevation view of the bottom arm assembly of FIG. 3A.
FIG. 4A is a top plan view of the middle arm assembly of FIG. 2 shown with suspension assemblies and magnetic head assemblies.

As is best seen in FIGS. 3A and 3B, the bottom arm member 10 has an enlarged through-hole 13 disposed at one end to which a gimbal-type suspension assembly 50a is attached. The suspension assembly 50a, in turn, supports a magnetic head slider assembly 60a which is swage mounted to the outermost end of the suspension assembly 50a by a mechanical process known in the art as "ball swedging". The preferred suspension assembly is constructed of nonmagnetic stainless steel and has a nominal spring force of about 2 to 8 grams. An example suspension assembly is the "Type 14 Suspension assembly" available through Hutchinson Technology Incorporated of Hutchinson, Minn.

The bottom arm member 10 is provided with a thin film head preamplifier/write current driver IC 17a (hereinafter "read/write IC 17") for controlling the logic functions of the head 60a and a coil driver and servo control IC 18 for controlling the logic and the power for the servo mechanism (i.e., for controlling the trajectory of the data access module 1). The head assembly 60a is connected to the read/write IC contact pads 54a and 55a via wires 52a and 53a, respectively. The wires 52a, 53a are directed along one side edge of the suspension assembly 50a by a provided wire guide tube 51a. The preferred read/write IC 17a performs a number of desirable logic functions including but not limited to those functions associated with read/write signal conditioning, data qualification, data synchronization and encoding/decoding tasks for the head.

As indicated in the drawings, number designations for identical elements on each arm member 10, 20 and 30 are referenced by successive alphabetical letters of a,b and c. For example, arm members 10, 20 and 30 each include a read/write IC 17a, 17b and 17c, respectively. As these elements are identical, their detailed description as to function is hereby incorporated by reference to the above description with reference to FIGS. 3A and 3B.

Figures 4B, 5A, 5B:
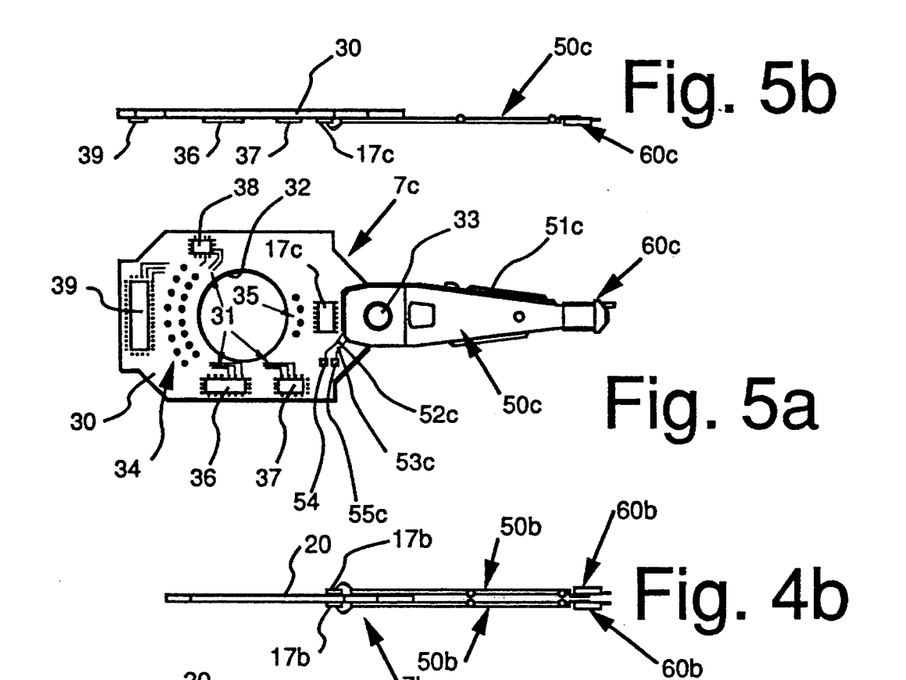
FIG. 4B is a side elevation view of the middle arm assembly of FIG. 4A.
FIG. 5A is a top plan view of the top arm assembly of FIG. 2 shown with a suspension assembly and magnetic head assembly.
FIG. 5B is a side elevation view of the top arm assembly of FIG. 5A.

Referring now to FIGS. 4A and 4B, the detail of the middle arm assembly 7b will now be described. The middle arm assembly's 7b primary function is to act as a carrier for positioning additional head assemblies on top and bottom surfaces of additional discs 2. To this end, the middle arm assembly is provided with a middle arm member 20 having two laterally extended suspension assemblies 50a disposed connected in back to back fashion to through-hole 23 of middle arm 20. As described above with reference to the bottom arm assembly 7a, top and bottom head assemblies 60b of the middle arm assembly 7b are each disposed swage connected to respective top and bottom distal ends of the two back to back facing suspension assemblies 50b. Similarly, two read/write ICs 17b and their associated electrical connecting elements (ie., wires 52b, 53b, wire and tube assembly 51b, and contact pads 54b, 55b) are provided to the middle arm assembly 7b for controlling the logic functions of the middle arm head assemblies 60b.

While the middle arm assembly 7b of the present invention is shown in the drawings as having only a single arm member 20 with connecting dual suspension assemblies 50b and coordinate head assemblies 60b, it is understood that any number of middle arm assemblies may be vertically stacked one on top of another. In this way, any number of discs 2 may be accessed by the data access module 1.

Alternatively, the middle arm assembly 7b may be omitted entirely if desired. Such may be the situation for a disc cartridge containing only a single double sided disc such that only top and bottom arm assemblies 7a and 7c are necessary.

As seen in FIGS. 5A and 5B, the top arm assembly 7b serves as a platform for mounting additional ICs. In the preferred embodiment, these Ics include all the control electronics for processing the logic information associated with the voice coil driver/servo control IC 18 on the bottom arm member 10 as well as read/write logic information generated from the head assemblies 60a, 60b and 60c and their respective read/write ICs 17a, 17b, and 17c. The control electronics may also include an integrated read channel IC 36, a program filter IC 37, a servo controller IC 38 and a servo channel control IC 39.

It will be appreciated by those skilled in the art that the specific selection of ICs used for the control electronics may vary greatly depending upon the type and extent of onboard data processing that is desired to be handled by the data access module 1.

An advantage of incorporating the control electronics directly onto the top arm member 30 of the data access module 1 is the dramatic decrease in capacitance loading resulting from a shorter path for signal processing. In the typical prior art rotary actuators, for example, signal information travels from the magnetic head to the rotary pivot and off the actuator to the appropriate read/write control circuitry associated with either the cartridge housing or disc drive and through the system bus for further processing at the host computer level.

In the present invention, this distance for signal processing is greatly reduced by approximately one half since all head read/write signal information travels between the head assembly 60 and the on board control electronics, all of which are located substantially at the pivot location (axis Z—Z) for the data access module 1. This shortened signal path provides a decrease in capacitance loading and also results in lower power consumption thus increasing battery life. This feature is particularly useful when the disc drive is implemented in a typical battery operable portable computer.

Figure 6A:
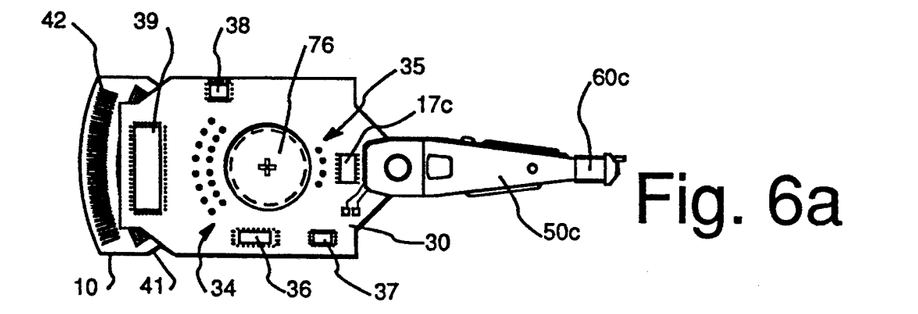
FIG. 6A is a top plan view of a fully assembled three arm data access module.
Figure 6B:
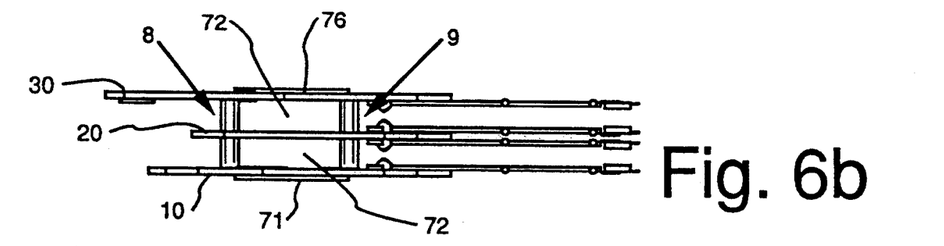
FIG. 6B is a side elevation view of the fully assembled three arm data access module of FIG. 6A.

As is best seen in FIGS. 2, 6A and 6B, each arm member of each arm assembly is provided with a first and second plurality of plated through-holes which serve as conductive pathways for transferring logic information on and off each arm assembly. For example, the bottom arm is provided with a first plurality of plated through-holes 14 and a second plurality of plated through-holes 15 for communicating logic information between the bottom arm assembly 7a with the adjacently stacked middle and upper arm assemblies 7b and 7c via their respective plated through-holes 24, 25 and 34, 35.

The two groupings of plated through-holes of each arm member 10, 20 and 30 are interconnected by two groups of pin connectors, generally designated at 8 and 9 (see FIG. 2), in accordance with known interconnecting techniques. Logic information concerning data access module position, trajectory control and servo control associated with the voice coil 41, position reticle 42 and coil driver/servo controller IC 18 are carried on and off the bottom arm member 10 through the first plurality of through-holes 14. This information passes through coordinate through-holes 24 and 34 of the middle and top arm members 20 and 30, respectively for processing with an appropriate controller IC disposed on the top arm member 30.

Similarly, signal information associated with the logic functions of the read/write ICs 17a, 17b and 17c are carried on and off the bottom, middle and top arm members 10, 20 and 30 through the second plurality of through-holes 15, 25 and 35, respectively for processing by the appropriate controller IC of the top arm member 30. Inlays (not shown) connect the through-holes to the various ICs.

To assemble the data access module 1 of the present invention, first the individual arm members 10, 20 and 30 are prepared as ceramic wafer substrates and their respective ICs are mounted and their platings are etched and their interconnecting traces (not shown) inlaid in accordance with standard wafer fabrication and photolithographic techniques. Next the head and suspension assemblies 60a–c and 50a–c are attached to the respective enlarged through-holes 13, 23 and 33 of arm members 10, 20 and 30 at hole.

A spindle 71 is then mounted on an appropriate rotary actuator mounting structure provided to the cartridge member base 3 and the bottom arm assembly 7a is mounted thereon such that the spindle 71 extends through the enlarged center through-hole 12 of the bottom arm member 10 in the manner as shown in FIGS. 2 and 6B. The middle and top arm assemblies, each having respective enlarged center through-holes 22 and 32, are then fitted over the spindle 71 in similar fashion, each being spaced from one another by spacers 72. The height of the spacers 72 may be varied to achieve the desired flying height and/or static positioning of the head assemblies 60a–c with respect to the head contacting surfaces of disc(s) 2. A threaded nut 76 is then receivingly engaged within a threaded bore hole in the spindle 71 to hold the individual arm assemblies 10, 20 and 30 together in rigid fashion. To assist in the alignment of the individual arm assemblies with respect to one another, the spindle 71 may be provided with a notch or nub extending along the outer spindle surface (not shown) which cooperates with a receiving tang or notch provided to each enlarged center through-hole 12, 22 and 32 of each arm member 10, 20 and 30. In this way, the arm assemblies are permitted to fit over the spindle in only one orientation.

Figure 7:
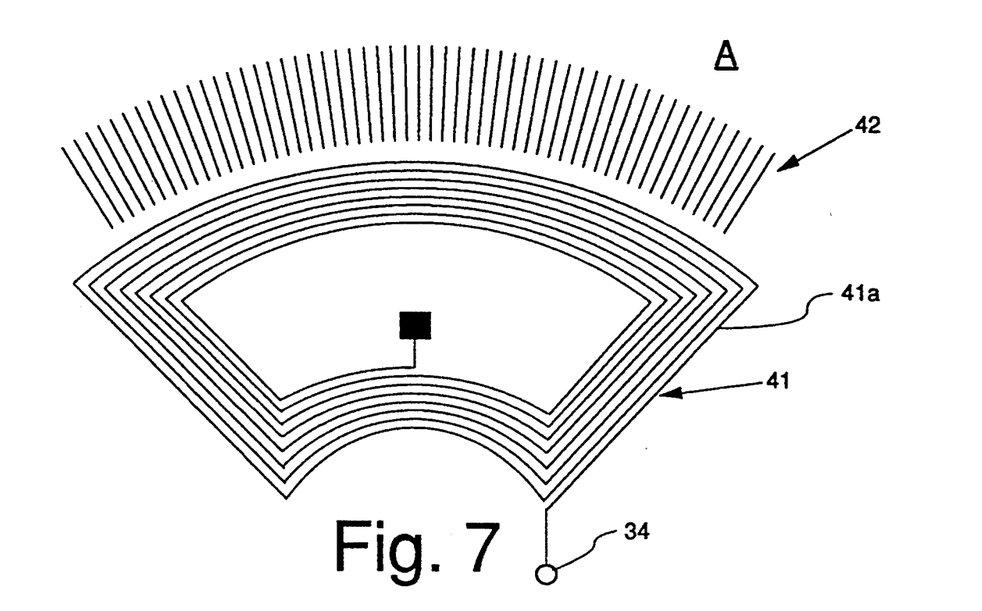
FIG. 7 is an enlarged schematic representation of the reticle position indicating stripes and a top half portion of the planar voice coil indicated generally by the dashed circular region A of FIG. 3A.

FIG. 7 is an enlarged schematic view of the voice coil assembly 41 and position reticle 42. In the preferred embodiment the voice coil assembly 41 is fabricated in two coil layers including coil 41a disposed along a top surface of bottom arm member 10 and coil 41b (not shown) disposed along the bottom surface of bottom arm 10 in a mirror image fashion to top coil 41a. The upper coil 41a is preferably used for a "fast seek" mode to provide maximum acceleration to the arm assembly when accessing data tracks on the disc. The bottom coil 41b is preferably used to provide track following, i.e. stiffness in holding the magnetic head stationary over a selected data track on the disc when connected in series with coil 1.

A "fast seek" mode coil requires fewer turns (number of coil windings) than a "track following" mode since the back EMF (electromagnetic force) increases as the number of coil windings is increased. In a "fast seek" mode, a smaller number of coil windings results in decreased resistance and less voltage is required to move the position reticle, while in a "track following" mode, a greater number of windings is desired since this increases the magnetic force of the position coils.

During head access operation, the top coil 41a is first energized after which current is held steady for a time and then shut off. During energization or current "ramp up" in the coil 41a, the arm assembly undergoes acceleration from a rest. The arm member and head assembly continue movement as current is held steady in coil 41a and then begins deceleration to rest once current to the coil 41a is shut off. Once "on track" confirmation is received from the head, the bottom coil 41b is energized and the top coil 41a is reenergized to hold the arm assembly (and magnetic head assembly) in position over the desired or selected data access track. The bottom coil is provided with a sufficient number of windings to provide a desired level of tracking stiffness to the head, ie., the head's ability to stiffly follow the selected data track. Both coils 41a and 41b are responsive to the provided microprocessor of the host computer (not shown) which in turn arbitrates the selective energization of the coils in response to the appropriate instructions and signal information received from the head.

A position reticle 42 is also provided to the top surface of bottom arm member 10 and is used to count data tracks and assist in improving accessing speed and error positioning of the head. In the preferred embodiment, the position reticle 42 is formed as a plurality of magnetized metal stripes which are plated into the surface of the bottom arm member 10. Due to its planar design, the position reticle 42 and also the voice coil assembly 41 are repeatable as masks on the bottom arm member 10.

Figure 7A:
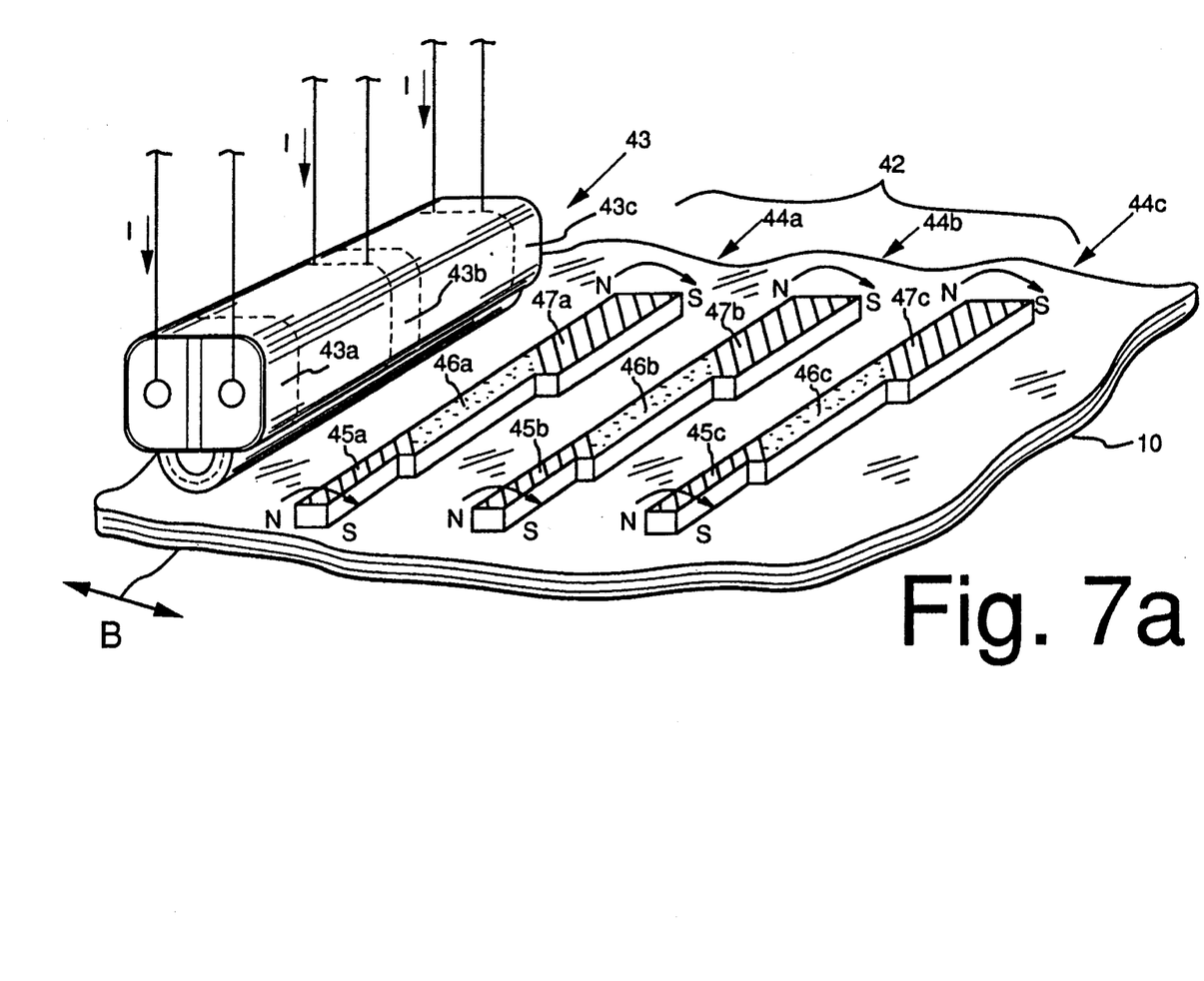
FIG. 7A is an enlarged fragmentary isometric view of the upper arm top surface showing a portion of the reticle position indicating stripes and a stationary three channel magnetoresistive read head positioned thereover.

As is best seen in FIG. 7a, the position reticle 42 comprises a plurality of stripes 44a, 44b, 44c. . . 44n, wherein each stripe is formed as a magnetized metal such as, for example, cobalt chrome and is polarized in the direction as indicated in the drawing. In operation, as the bottom arm member 10 undergoes pivotal movement as indicated by the direction of double arrow B, the magnetized stripes 44a, 44b, 44c. . . 44n pass under the magnetoresistive head 43 thus generating output signals. These output signals relate data track position information to the microprocessor of the host computer. As is seen in the drawings, each stripe 44a, 44b, 44c. . . 44n comprises three segments which vary progressively in thickness from one to another. For example, stripe 44a includes a first thin width segment 45a, a middle width segment 46a and a still wider segment 47a.

Each stripe 44a-n represents every fourth track designation on the disc while the three varying width segments 45a-n, 46a-n and 47a-n of each stripe 44a-n represent the intervening tracks on the disc. In this way, the stripe and segment configuration is coordinated with the "quad burst" addressing scheme conventionally used for addressing tracks on a magnetic storage disc. So for example, as the stripe 44a moves under the MR head a first track is counted. A second track is counted once the magnetic flux associated with segment 45a is no longer detected by the MR head. Successive tracks 3 and 4 are counted once their successive magnetic fluxes are no longer read by the MR head 43.

The total number of stripes 44a-n and the geometry and width of each segment 45a-n, 46a-n and 47a-n within each stripe required are dependent upon the number of tracks per inch (TPI) on the disc. For example, for a 2000 TPI disc having a typical track width of 13 microns, the total number of stripes 44 required would be one-fourth the TPI spacing or 500 stripes.

Figure 7B:
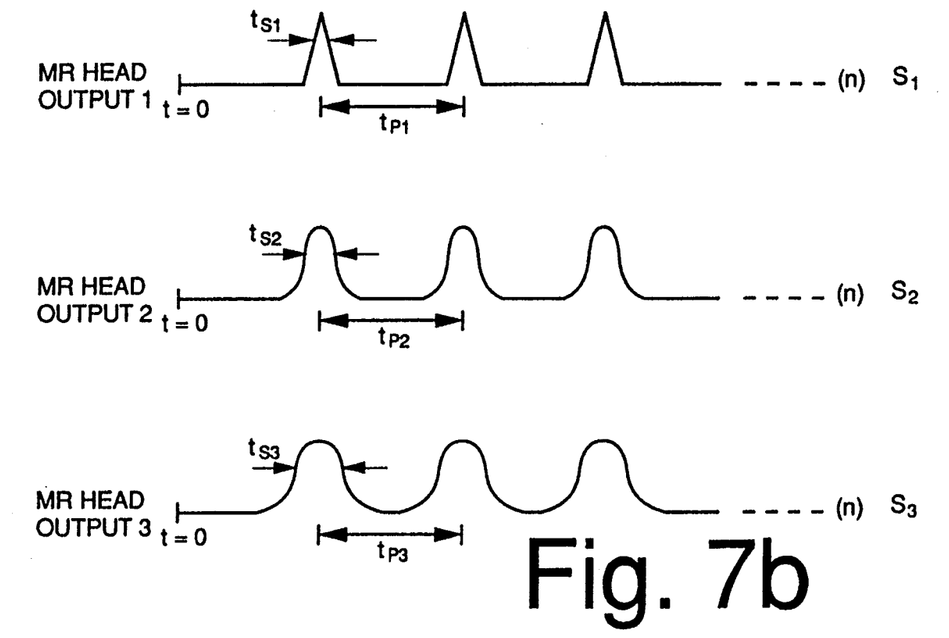
FIG. 7B is a signal response diagram showing signal output measured by magnetoresistive head as a function of time for a constant velocity.

As is seen in FIG. 7a, the MR head 43 includes three outputs each dedicated for reading a particular segment within each track 44a-n. In an alternative embodiment, three separate MR heads may be used for this purpose and are indicated generally in phantom by numerals 43a, 43b and 43c. FIG. 7b represents a series of greatly simplified signal response curves graphed as a function of time showing the signal response for each MR head output at a given constant access velocity.

The position reticle 42 aids in achieving faster the accessing speeds for the magnetic head assemblies 60a-c since it is able to count the stripe positions faster than the magnetic head assemblies are able to keep a record of the data tracks when using the quad burst addressing scheme. For example, for any given disc having a rotational velocity of 3600 rpm it typically takes up to 16 milliseconds for one complete disc revolution. In many instances the address information may only be encoded in at most two sectors of the track. Thus, requiring up to 8 milliseconds for accessing the proper address. Since the MR head 43 is continuously outputting track count information directly to a common processor means at all times and not at 8 millisecond intervals like the heads, this information may be used the processor means to increase access speed.

The position reticle 42 may also be used to aid in error positioning. During deceleration of the arm assembly 7 (ie., when coil 41a is deenergized) a typical problem is arises where the head overshoots the desired track location. This is known as a soft error. Since the MR head 43 is accurately counting each track as it reads the stripes 44a-n of the position reticle, this information can be used either by the microprocessor in the computer or on the top arm member 30 to determine the number of tracks necessary to bring the arm and head assemblies back into proper position.

Figure 8:
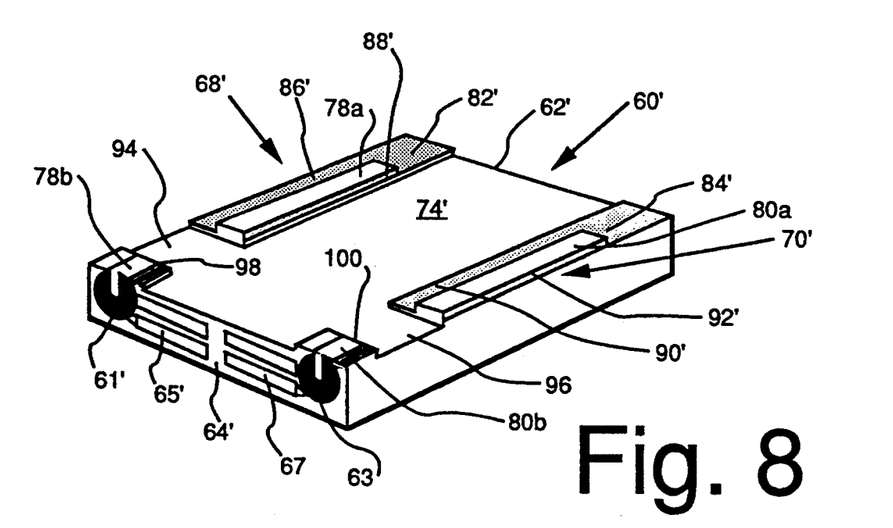
FIG. 8 is an isometric view showing the front side (i.e. disc facing side) of one embodiment of a magnetic head slider assembly of the present invention.
Figure 9:
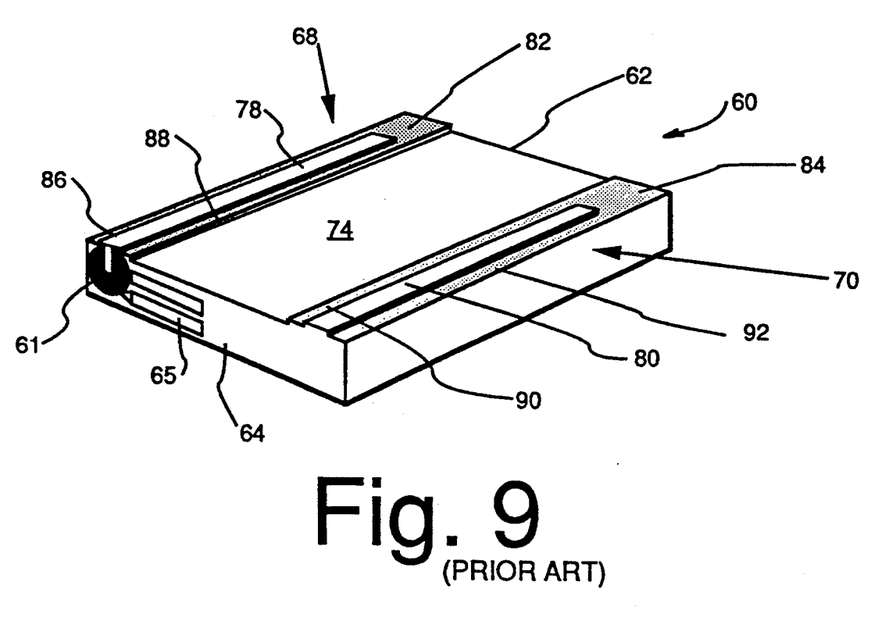
FIG. 9 is an isometric view showing the front side (i.e. disc facing side) of a typical prior art magnetic head slider assembly of the present invention.

FIGS. 8 and 9 illustrate, by way of example, a comparison of the preferred embodiment for an air bearing magnetic head slider assembly 60' of the present invention (FIG. 8) and a typical prior art example of an air bearing magnetic head slider assembly 60 (FIG. 9). For purposes of the following discussion, structural elements generic to both the preferred slide assembly embodiment of the invention (FIG. 8) and the typical prior art of the embodiment (FIG. 9) are repeated and further indicated by prime numerals in the preferred embodiment.

As is seen in FIG. 9, the typical prior art slider assembly 60 is formed as a substantially rectangular block having a forward or leading edge 62 and a trailing edge region 64. The slider assembly 60 further includes a pair of rails 68 and 70 disposed spaced apart and separated by a deeply recessed region 74 along the air bearing surface in a substantially conventional manner. During operation, air is introduced to the forward edge 62 of the slider assembly and becomes pressurized underneath the rails 68 and 70 to form an air bearing for the slider assembly. To generate the desired lift, the forward edges of the rails 68 and 70 typically include a tapered leading edge or a step region such as the step compression zones 82 and 84 shown in FIG. 9. The air bearing surfaces 78 and 80 of the slider rail 68 and 70 are further provided with transverse pressurization contours 86, 88 and 90, 92 respectively.

From the prior art it is recognized that these transverse pressurization contours significantly reduce roll and help to maintain an even flying height for the slider head assembly as the slider is moved across the disc when accessing various data tracks. It is also recognized that the specific configurations of the inner and outwardly disposed transverse pressurization contours may be varied to provide the desired dynamic stability and insensitivity to angular skew effects depending upon the range of skew magnitudes, disc size and disc velocities which are involved. These teachings and the technical solutions for these problems are well addressed in U.S. Pat. Nos. 4,673,996 and 4,218,715 both issued to Dr. James W. White and are incorporated herein by reference.

As is typical in the prior art, a magnetic transducer element 61 (typically a thin film magnetic transducer) is disposed adjacent to either one or both of the air bearing surfaces 78, 80 adjacent the trailing edge region 64 of the slider assembly 60. A gold plated contact 65 or like electrical connection is provided as a connector means to the read/write circuit means (i.e., read/write ICs 17a-c and FIGS. 2-5 not shown).

A difficulty encountered with the above configuration of the typical prior art slider head assembly is maintaining a desired stiffness of the air bearing at the trailing edge region adjacent the transducer element. This is due to the fact that as air is introduced to the forward or leading edge portions of the air bearing surfaces 78 and 80 at the step compression zones 82 and 84, the air tends to escape and move laterally from the air bearing surface as it travels the longitudinal length of the slider rails. This results in a decrease in the air pressure on the air bearing surfaces towards the trailing edge region 64. Thus, the vertical stiffness of the air bearing is lowest where it is needed most, that is at the trailing edge of the air bearing surface adjacent the transducer element 61. Any sudden vibration or disturbance to the disc drive (a common situation for laptop and notebook users) will cause the slider and/or transducer to crash into the disc surface. Accordingly, it is desirable to boost or increase air pressure on the air bearing surface in these regions to prevent such an occurrence from happening.

Furthermore, unlike the prior art, the lift-off time for the slider assembly during initialization of disc rotation is greatly reduced because of the pad structure since the rear step compression zones 98 and 100 provide an additional pressurized "kick" to boost the trailing edge portion 64' upwards for rapidly achieving an even flying height.

Referring now to the preferred embodiment of FIG. 8, the slider rails 68' and 70' are further divided into forward air bearing sections 78a, 80a and rear air bearing sections 78b and 80b, respectively by introduction of cross cut or transverse recesses 94 and 96 to the slider rails 68' and 70'. The cross cut transverse recesses 94 and 96 provide an expansion region for air coming off of the forward air bearing surfaces or sections 78a and 80a. The rear air bearing sections 78b, 80b are provided with step compression zones 98 and 100 to boost or increase the pressure of the air bearing at the trailing edge region 64' of the slider assembly 60' to increase vertical stiffness in this area. In the embodiment shown, the rear air bearing surfaces or sections 78b and 80b also include continuations of the transverse pressurization contours associated with the forward air bearing surfaces 78a and 80a. It will be appreciated by those skilled in the art that the dimensions and configurations of the transverse pressurization contours, step compression zones and cross cut traverse recesses may be varied to achieve a desired result for a particular end use of the slider assembly.

It has also been found that by introducing a step compression zone in the air bearing surface adjacent the trailing edge of the slider assembly, that the damping qualities of the air bearing surface are also much improved and lower constant flying height are achieved.

Figure 10:
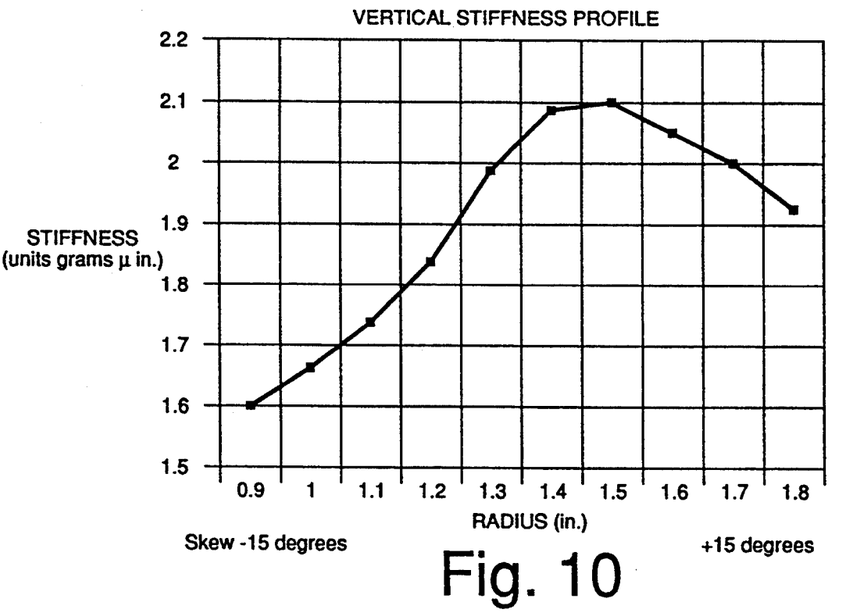
FIG. 10 is a graphical representation of performance of the magnetic head slider assembly of the present invention showing air bearing vertical stiffness as a function of skew angle.
Figure 11:
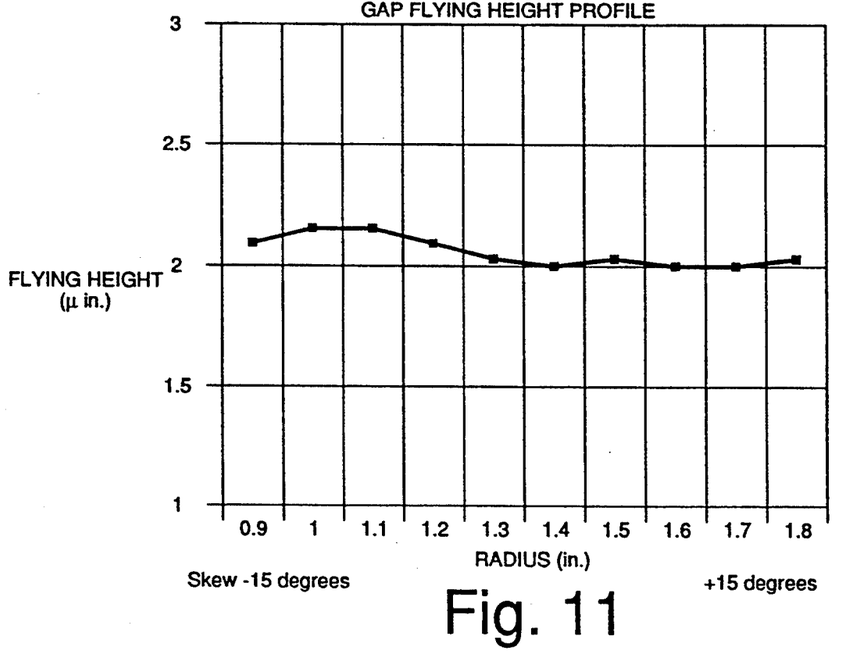
FIG. 11 is a graphical representation of performance of the magnetic head slider assembly of the present invention showing flying height as a function of skew angle.
Figure 12:
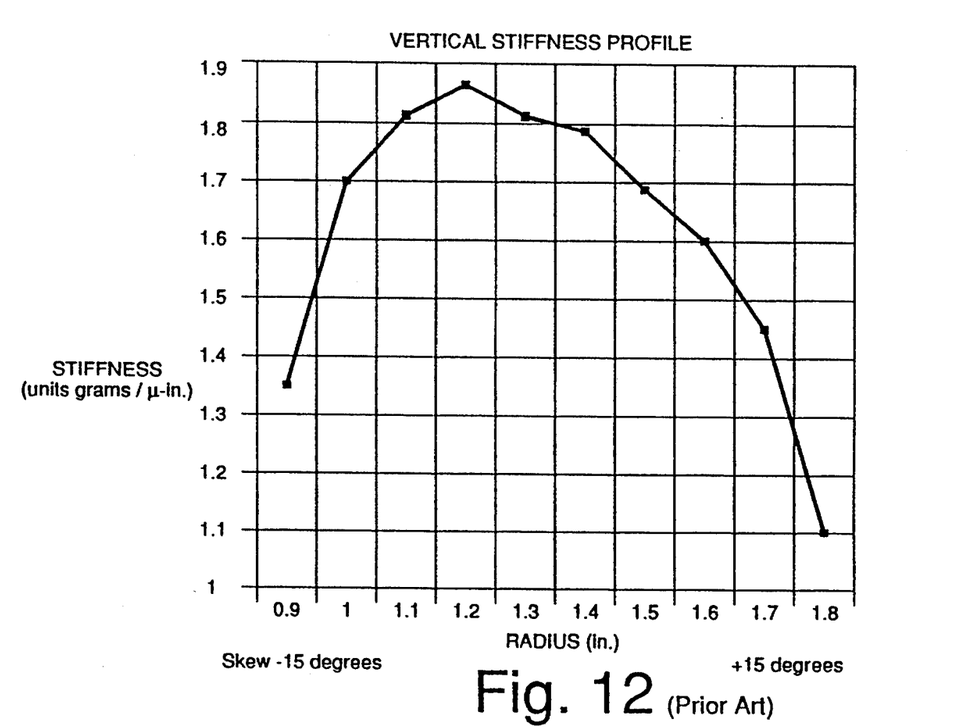
FIG. 12 is a graphical representation of the typical performance of the prior art magnetic head slider assembly of FIG. 9 showing air bearing vertical stiffness as a function of skew angle.
Figure 13:
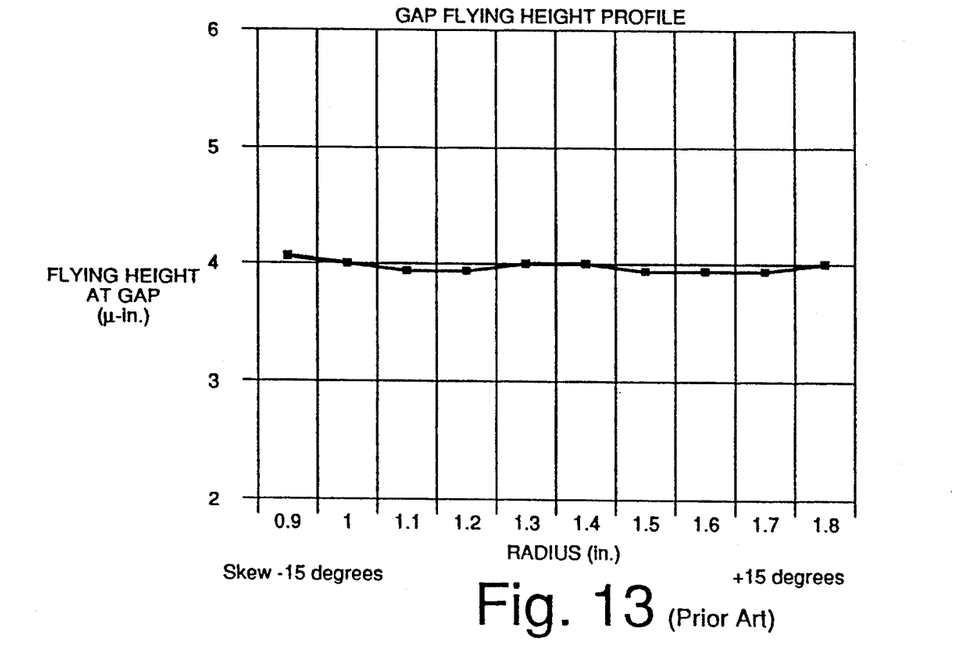
FIG. 13 is a graphical representation of the typical performance of the prior art magnetic head slider assembly of FIG. 9 showing flying height as a function of skew angle.

FIGS. 10 and 11 illustrate two graphical plots obtained by computer simulation which highlight the performance characteristics of the improved magnetic slider head assembly of the present invention as shown in FIG. 9. For comparison, computer simulated graphical plots for the typical prior art magnetic head slider assembly (FIG. 9) are shown in FIGS. 12 and 13. These comparisons were performed using the AIRBEAR computer code developed by Dr. White and referred to in his U.S. Pat. No. 4,673,966. The code is designed to study the performance of magnetic slide heads. The comparative results were based on a 2.5 inch disc operating at a rotational velocity of 5400 rpm. The step heights and step widths for each transverse pressurization contour and step compression zone of the two slide heads were substantially identical.

FIG. 10 is a vertical stiffness profile which illustrates air bearing stiffness as a function of skew angle and disc radius. Depending on the orientation of the slider assembly with respect to a radial line on the disc, the skew angle can be positive or negative. In the present description of the invention, a negative skew is taken to be the range of angles of the slider head as it moves from its neutral center position to the inner disc radius (see FIG. 1). Similarly, positive skew is taken to be the range of angles that the slider assembly as it moves from its neutral center position to the outer disc radius (see FIG. 1).

From the vertical stiffness profile of FIG. 10 it is readily apparent that the vertical stiffness of the slider assembly reaches a maximum stiffness of about 2.1 grams per micro inch just after reaching the neutral center position (at about a disc radius distance of 1.5 inches) and tapers off slowly thereafter to about 1.9 grams per micro inch at the outer disc radius (i.e., in the positive skew direction).

For comparison, a vertical stiffness profile for the typical prior art slider head assembly (element 60 of FIG. 9) is shown in FIG. 12. As is seen from a comparison of FIGS. 10 and 12, the typical slider head assembly of the prior art has a lower air bearing stiffness at the inner disc radius and peaks to a stiffness of about 1.85 grams per micro inch just prior to reaching the neutral center position (0 skew angle) and tapers quickly thereafter to a reduced value of 1.1 grams per micro inch at the outer disc radius (at the area of maximum positive skew angle). Thus the improved slider head configuration of the present invention exhibits improved stiffness over the entire range of skew angles, in this case, a typical rotary axis slider assembly having a 30 degree yaw angle.

FIG. 11 is a graphical plot of the gap flying height profile of the slider head assembly of the present invention. FIG. 13 is a similar gap flying height profile based on the typical prior art slider head assembly of FIG. 9. As is seen from a comparison of FIGS. 11 and 13, the slider head assembly of the present invention exhibits a marked improvement in the reduction of a constant flying height attainable by the configuration of the air bearing surfaces of the present invention.

The lower constant flying height and increased air bearing stiffness achieved by the slider head assembly of the present invention result in improved efficiency for the head, since signal strength from the head output increases at lower flying heights. Thus, the head is better able to discern the desired signal frequency over other noise. Also, in view of the relative uniformity of the head flying height over this entire range of disc radii, the signal frequency driven to the head can be increased without significant loss of signal strength. This is possible even at the inner disc radius where the disc tangential velocity is slower, since the transverse or cross cut sections and added step compression zones in trailing edge regions of the slider rails provide sufficient vertical stiffness to enable the head to fly at a lower constant height without "crashing" onto the disc surface.

Further, by increasing the flux of the frequency that the head may be driven, it is possible to obtain greater zone capacity on the disc (i.e., bytes per area density). The signal frequency may be altered so that the bit spacing appears uniform on all data tracks from disc ID to OD, irrespective of changes in tangential velocity.

Figure 14:
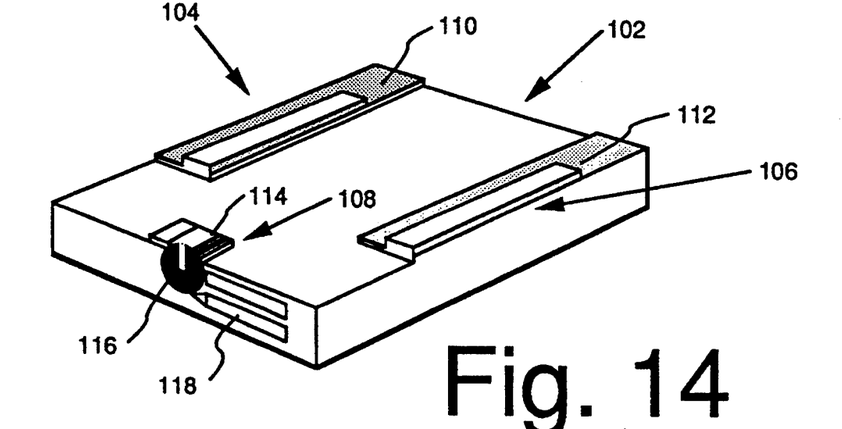
FIG. 14 is an isometric view showing the bottom of an alternate embodiment for a tri rail magnetic head slider assembly.

FIG. 14 is an alternative embodiment of the magnetic head slider assembly 102 of the present invention. This alternate embodiment is an improvement of typical prior art three rail systems and includes side rails 104, 106 and a middle rail 108. Each of the rails includes a step compression region 110, 112, and 114 respectively. Step compression regions 110 and 112 of side rails 104 and 106 provide the necessary pressurized air to the air bearing surface for proper liftoff and step compression zone 114 of middle rail 108 provides stiffness for the air bearing adjacent the transducer element 116. As before, the transducer element 116 is provided with an electrical contact 118, preferably gold plate, for signal communication with the read/write circuitry of the transducer head (i.e. read/write ICs 17a–c of FIGS. 2–5).

Figure 15:
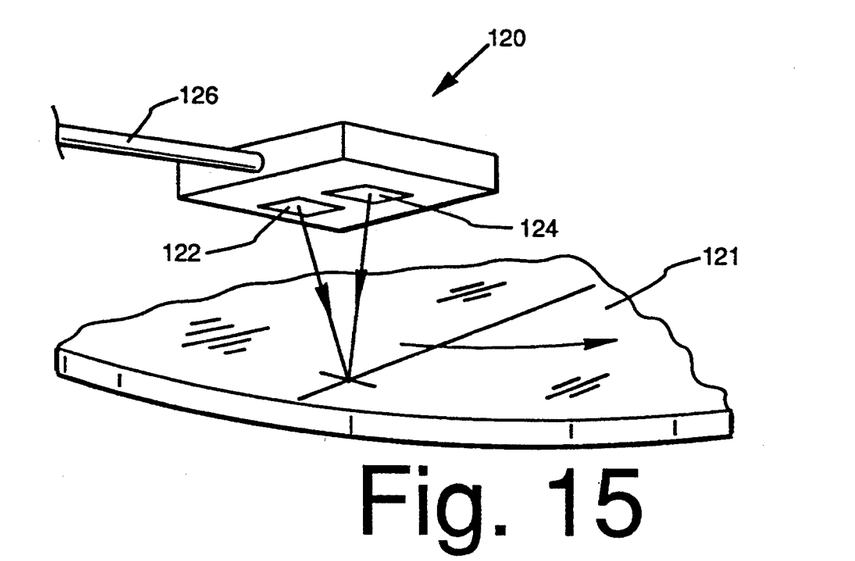
FIG. 15 is an isometric view of another alternate embodiment for the slider head assembly showing an optical read head element.

FIG. 15 illustrates yet another alternate embodiment for the invention wherein the slider head assembly 120 is an optical read head which includes an emitter 122 and a detector 124 for reading and writing optical signal information from a rotating disc 121. The optical read head 120 is positioned by a suspension assembly or flexure 126 connected to and arm member (not shown) as described above with reference to the preferred embodiment.

It should be understood that various modifications within the scope of this invention can be made by one of ordinary skill in the art without departing from the spirit thereof. We therefore wish my invention to be defined by the scope of the appended claims as broadly as the prior art will permit, and in view of the specification if need be.

What is claimed is:

1. A data access module for accessing information from rotational disc storage media in a fixed or removable cartridge rigid disc drive which includes an electrical interface for said data access module and magnetic actuator means, and wherein the data access module is rotatably mounted on a provided support means disposed adjacent the outer periphery of the disc storage media, said data access module comprising:
   a) a first head assembly having means for data transmission to and reading data from said disc storage media;
   b) a lower arm assembly rotatably mounted to the support means for rotary movement about a vertical axis, and wherein said lower arm assembly includes:
      i) a first arm member fabricated as a rigid wafer thin ceramic platform, said first arm member having a top and bottom surface and a first plurality of conducting through holes; and
      ii) a first distal end member attached to said first arm member and to which said first head assembly is connected; said lower arm assembly being operative to position said first head assembly over a desired data track location on said disc storage media;
   c) coil means disposed on said first arm member and communicatively spaced from said magnetic actuator means, the interaction between said coil means and said actuator means moving said lower arm assembly and said first head assembly about said vertical axis and relative to said disc storage media when said coil means is electrically energized;
   d) a first electronic control means comprising a plurality of integrated circuits (ICs) mounted on at least one of said top and bottom surfaces of said first arm member for processing read/write and servo data associated with said head assembly and for controlling energization of said coil means in response to signal information received via said electrical interface;
   e) first circuit means comprising wafer fabricated conductive trace inlays disposed on said first arm member for electrically interconnecting said electronic control means, said coil means, the first plurality of conducting through holes, and said first head assembly;
   f) an upper arm assembly including a second arm member fabricated as a rigid, wafer thin ceramic platform having a second plurality of conducting through holes, and a second distal end member, said second arm member being disposed a spaced distance above and parallel to said first arm member, said second arm member having a rotary pivot axis aligned coordinate with said vertical axis, said second plurality of conducting through holes being vertically aligned with said first plurality of conducting through holes;
   g) a second head assembly connected to said second distal end member for data transmission to and reading data from said disc storage media;
   h) a second electronic control means mounted on said second arm member and including a plurality of ICs for processing read/write and servo data associated with said second head assembly and for channel selection and processing of read/write and servo data between said first head assembly and said second head assembly;
   i) second circuit means comprising wafer fabricated conductive trace inlays disposed on said second arm member for electrically interconnecting said second electronic control means, the second plurality of conducting through holes, and said second head assembly; and
   j) a plurality of conducting pin connector means extending through the first and second plurality of conducting through holes of said first and second arm member and electrically interconnecting said first and second circuit means.

2. A data access module as recited in claim 1 wherein said rotatable disc storage media includes at least an upper disc and a lower disc, the upper surface of said upper disc being accessed by said upper arm assembly, and the lower surface of said lower disc being accessed by said lower arm assembly, and further comprising:
   a) at least one middle arm assembly including a third rigid, wafer thin ceramic platform arm member having a third plurality of conducting through holes vertically aligned with said first and second plurality of conducting through holes and at least a third distal end member attached to said third arm member, said middle arm assembly being disposed a spaced distance above said lower arm assembly and a spaced distance below said upper arm assembly and in axial rotational alignment with both of said lower and upper arm assemblies to form a multi-level, vertical stack of arm assemblies;
   b) a pair of opposed facing head assemblies connected to said third distal end member for accessing the lower surface of said upper disc and the top surface of said lower disc;
   c) a third electronic control means mounted on said third arm member, said third electronic control means comprising a plurality of ICs for processing read/write and servo data associated with said pair of opposed facing head assemblies; and
   d) third circuit means comprising wafer fabricated conductive trace inlays disposed on said third arm member for electrically interconnecting said third electronic control means, the third plurality of conducting through holes, and said pair of opposed facing head assemblies, said plurality of conducting pin connector means extending through said third conducting through holes and electrically interconnecting said third circuit means to said first and second circuit means.

3. A data access module as recited in claim 1 wherein said head assembly includes means for optical signal data transmission with said disc storage media.

4. A data access module as recited in claim 1 wherein said head assembly is a slider head support structure of the kind for supporting transducer elements and having two slider rails disposed along an air bearing surface and which includes a leading edge portion and a trailing edge portion, at least one transducer element disposed along said trailing edge portion, and wherein each slider rail is selectively provided with transverse pressurization contours along longitudinal slider rail edges for reducing skew-induced roll and which further permits the slider head assembly to fly at a desired constant flying height above said rotational storage media and wherein:
   a) each of said slider rails is further provided with a transverse relief portion disposed adjacent said trailing edge of said air bearing surface, said transverse relief portions being aligned with each other and dividing each of said slider rails into a first, forward slider rail portion and a second, rear slider rail portion; and
   b) each of said second, rear slider rail portions is provided with a step compression zone along a forward edge portion thereof to increase vertical stiffness in the region of the air bearing trailing edge portion.

5. A data access module as recited in claim 1 wherein said head assembly is a slider head support structure of the kind for supporting transducer elements and having three slider rails disposed along an air bearing surface, and wherein:
   a) two of said slider rails are disposed along opposite side edges of and parallel to a longitudinal axis of said air bearing surface, said two side rails being equal in length and each having a first forward end disposed adjacent a leading edge portion of said air bearing surface and a second terminal end disposed at a distance intermediate of a trailing edge portion of said air bearing surface;
   b) said third rail is disposed along said longitudinal axis, said third rail having a first forward end disposed at a gap distance from said terminal ends of said side rails and a second terminal end disposed coordinate with said trailing edge portion of said air bearing surface; and
   c) each of said slider rails having selectively provided transverse pressurization contours along their respective longitudinal side edges for reducing skew-induced roll and which further permit the slider head assembly to fly at a desired constant flying height above said rotational storage media; and
   d) said third rail having a step compression zone provided at said first forward end thereof to provide increased air bearing stiffness at said trailing edge portion of said air bearing surface.

* * * * *